United States Patent Office 3,793,245
Patented Feb. 19, 1974

3,793,245
PROCESS FOR THE PREPARATION OF A POLYMER DISPERSION IN AN INERT ORGANIC LIQUID
Michael Raymond Clarke, Ottawa, Ontario, and Leon Filipowicz, Montreal, Quebec, Canada, assignors to Balm Paints Limited, Melbourne, Victoria, Australia
No Drawing. Continuation-in-part of abandoned application Ser. No. 840,056, July 8, 1969. This application June 2, 1971, Ser. No. 149,376
Int. Cl. C08f 47/20; C08g 53/18
U.S. Cl. 260—34.2                                                                 5 Claims

ABSTRACT OF THE DISCLOSURE

A process of preparing a dispersion of polymerized $\alpha,\beta$-ethylenically unsaturated monomer in an inert organic liquid in a two-stage process consisting of a seed stage and a feed stage. From 7–70% by weight of the total polymerizable monomer is first polymerized in the liquid in the presence of copolymerizable polymeric stabilizer in the weight proportion of from 1:10 to 15:1 as the seed stage. The remaining monomer is then added to and polymerized in the seed stage in the presence of seed stage stabilizer, the total weight of polymeric stabilizer in the dispersion being from 0.5–50% by weight of the weight of disperse polymer.

---

This is a continuation-in-part of prior U.S. application Ser. No. 840,056, filed July 8, 1969, now abandoned. It also is an improvement over U.S. Pat. No. 3,514,500, Clarke et al. U.S. application Ser. No. 886,777, filed Dec. 19, 1969, U.S. application Ser. No. 740,469, filed June 27, 1968, now U.S. Pat. No. 3,607,821, and Osmond et al. U.S. application Ser. No. 807,909, filed Mar. 17, 1969 (now abandoned) the disclosures of which are hereby incorporated herein by reference.

This invention relates to a process of preparing dispersion of polymer in inert organic liquids.

It has been proposed to prepare a dispersion of polymer in an inert organic liquid in which the polymer is insoluble by polymerizing $\alpha,\beta$-ethylenically unsaturated monomer in the liquid to form the disperse polymer in the presence of a polymeric stabilizer which associates with the polymer and sterically stabilizes the dispersion. The general method of preparation is to add to the inert liquid, heated to the selected polymerization temperature, an aliquot part of the charge comprising unsaturated monomer, polymerization initiator and dispersion stabilizer, which react to form a low-solids dispersion of polymer. This part of the process is commonly referred to as the "seed stage" and typically utilizes up to 5% by weight of the total monomer charge. The balance of the charge is then added gradually to the batch over a fixed period of time and the reaction temperature sustained for a sufficient time to convert substantially all of the unsaturated monomer to polymer. Careful control of addition rates must be exercised to avoid producing unstable dispersions and this in turn limits the minimum processing times which can be achieved.

We have now found that provided certain classes of stabilizers are used in the dispersion and the processing is carried out in the manner hereinunder described these limitations on processing time are avoided and certain other advantages which will become apparent from the following description are gained.

According to the present invention we provide a process of preparing a dispersion of polymer in an inert organic liquid in which the polymer is insoluble by polymerizing $\alpha,\beta$-ethylenically unsaturated monomer in the liquid to form the polymer in the presence of a polymeric dispersion stabilizer in a two-stage reaction consisting of a seed stage and a feed stage and characterized in that:

(1) The seed stage comprises the inert organic liquid to which is added the said unsaturated monomer and copolymerizable polymeric stabilizer as hereinunder defined in a proportion by weight of from 1:10 to 15:1, provided also that the amount of unsaturated monomer shall be from 7–70% by weight of the total monomer providing the disperse polymer;

(2) The feed stage comprises the remaining unsaturated monomer and feed stage polymeric stabilizer as hereinunder defined;

(3) The total weight of polymeric stabilizer in the dispersion is from 0.5–50% by weight of the weight of disperse polymer.

In a preferred embodiment of the invention the concentration of polymeric stabilizer added to the dispersion with unsaturated monomer during the feed stage is progressively decreased as the proportion of added monomer increases.

By an inert organic liquid we mean a liquid which is a nonsolvent for the disperse polymer and inert with respect to the chemical reactions forming the stabilized disperse polymer.

The disperse polymer is formed by the polymerization of at least one $\alpha,\beta$-ethylenically unsaturated monomer. Suitable monomers are, for example:

halogenated vinyls, e.g., vinyl chloride and vinylidene chloride;
aromatic substituted vinyls, e.g., styrene, $\alpha$-methyl styrene and the commercial mixed isomers known as vinyl toluene;
ethers of vinyl alcohol, e.g., the ethyl, n-propyl, iso-proply, n-butyl, iso-butyl, 2-methoxy and benzyl ethers; and
alkyl esters of mono- and di-carboxylic acids, e.g., acrylic, methacrylic, maleic and fumaric acids with saturated mono-alcohols, e.g., methanol, ethanol, n-propanol, iso-propanol, n-butanol, sec-butanol, cyclohexanol, 2-ethyl hexanol and dodecanol.

More highly polar polymers may be made by the polymerization or copolymerization of highly polar monomers such as the above-mentioned unsaturated acids themselves, their acid esters and their polar derivatives such as acid chlorides, amides and methylolamides.

The polymeric stabilizers used in this invention have the following general characteristics. The stabilizers are polymeric in the sense that they may contain as few as three or four, but usually contain ten or more repeating monomeric units per molecule. The stabilizer which initially is soluble in the non-aqueous liquid of the dispersion, must associate with the disperse polymer and comprise one or more components which are solvated by the organic liquid and provide around the disperse polymer particles a stabilizing steric barrier.

The associative force between the stabilizer and the disperse polymer may, for example, be a mass-dependent force generated between components of the stabilizer which are not solvated by the organic liquid and the disperse polymer. Alternatively, it may be a force generated by strong specific interaction between polar groups in the stabilizer and complementary polar groups in the disperse polymer. These associative forces, which arise between the disperse polymer and what may be termed an anchoring component of the stabilizer, are essentially the result of electrostatic attraction between polar and/or dipolar charges in the disperse polymer and the anchoring component of the stabilizer; they range from the mass-dependent forces which may be of the London or Van der Waal type arising from attraction between multitudinous weak dipoles in the disperse polymer and anchor components of the stabilizer to specific interaction forces between much smaller numbers of strong polar or dipolar groups, in some cases only a few or even single very strong polar or dipolar groups.

The stable dispersions of particles of synthetic polymer in inert organic liquid in which the polymer is insoluble may be made by dispersing particles of the polymer in the liquid in the presence in solution in the liquid of a stabilizer containing polar groups, the disperse polymer being one containing polar group capable of entering into strong specific interaction with polar groups in the stabilizer so as to cause the stabilizer to be bonded to the polymer particles and provide around them a stabilizing steric barrier at least 12 A. thick.

By strong specific interaction we mean that the bond energy between the pairs of interacting polar groups should be at least about that corresponding to the bond energy between ester carbonyl groups interacting with nitrile groups in an aliphatic hydrocarbon liquid.

Where the bond energy is about this level or slightly higher, say that of ester carbonyl groups interacting with aliphatic hydroxyl or carboxyl groups in an aliphatic hydrocarbon liquid the stabilizer molecule should contain on average at least 50 polar groups and preferably at least 100 polar groups in order to ensure that sufficient groups interact with complementary groups in the disperse polymer to provide the necessary stabilizer bond energy. In one embodiment the polymeric chain itself of the stabilizer provides the steric barrier in the form of random extended tails or coils or loops solvated by the organic liquid of the dispersion, the tails, coils or loops being attached at one or both ends to the polymer particle by specific interaction of polar groups. Not all the polar groups in the stabilizer will be interacted in this configuration; a major proportion will be located in the extended tails, coils or loops out of contact with the polymer particle. The thickness of the steric barrier is determined by the effective pendent length of such tails, coils or loops. The steric barrier must be at least 12 A. thick and in practice in this configuration it is usually not less than 30 A. thick because of the polymeric nature of the stabilizer, this degree of thickness being provided by the solvated tails, coils and loops.

The higher the bond energy of the polar groups the higher is the proportion interacted with the polymer and further, each bond makes a larger contribution to the total stabilizer bonding energy. In consequence as the bond energy is increased the stabilizer can contain fewer polar groups per molecule and with a bond energy level of about that corresponding to the interaction of nitrile with nitrile or of alkyl hydrogen phosphate with amine in aliphatic hydrocarbon the stabilizer may contain on average as few as 10 but preferably not less than 20 polar groups per molecule, most of which will be interacted with the polymer surface. Where, therefore, the steric barrier is to be provided by tails, coils or loops of the polymeric chain itself of the stabilizer the tails, coils or loops will usually be relatively free of strongly acting polar groups. In general, using stabilizers of this type and in this configuration two polar groups should serve to anchor at least 50 A. of solvated chain, i.e. on average the stabilizer polymer chain should provide at least 50 A. of solvated chain between polar groups, this length corresponding to a minimum molecular weight of approaching 1,000.

With even stronger bond energy, say above about that corresponding to the interaction of mono- or di-alkyl phosphate groups with amine groups in aliphatic hydrocarbon, the stabilizer can contain even fewer groups, usually from 1–10 being suitable though in some circumstances the use of stabilizers containing more than a few polar groups can lead to thickening of the dispersion. Again, it is the solvated tails, coils and loops provided by the polymeric chain itself of the stabilizer which provides the steric barrier and again in practice the barrier is usually not less than about 30 A., being provided by a polymer chain of molecular weight not less than several thousand.

The prime requirement in all cases is that the stabilizer as a whole be soluble in the organic liquid of the dispersion and consequently it must consist at least in part of chain-like segments or components which are solvated by the liquid. These solvated segments or components, being in an extended configuration in the liquid, provide the solvated steric barrier around the polymer particles.

The degree to which a chain-like segment or component is solvated by any particular organic liquid depends on the polarity of the segment or component relative to that of the liquid and its polarity in turn depends on the nature of the links of the chain itself and of the atoms or groups attached thereto. If the segment or component and liquid are of similar polarities then in general the segment or component will be solvated by the liquid and will be freely extended in the liquid; in such a liquid, stabilizer associated with insoluble polymer particles can provide a stabilizing steric barrier of solvated segments or components. If they were of dissimilar polarity relative to the liquid then the segments or components would be relatively nonsolvated, if solvated at all, and would be in a collapsed or coiled state in which they could not provide a steric barrier adequate to prevent flocculation of the particles. The choice of the chain-like segment or component is, therefore, determined by the nature of the organic liquid in which the polymer is dispersed. For example, where the organic liquid of the dispersion is nonpolar, e.g. an aliphatic or aromatic hydrocarbon, the chain-like segment or component should also be nonpolar and where the organic liquid is polar, e.g., a ketone, ester or ether, the chain-like segment or component should also be similarly polar.

The nature of the organic liquid is in turn related to the nature of the polymer to be dispersed therein since the liquid must be a nonsolvent for the polymer. This, in general, implies that the organic liquid must be of different polarity to that of the polymer though some polymers which have a highly crystalline structure are insoluble in most organic liquids irrespective of polarity.

The polar and complementary polar groups may be acidic and basic groups, the bond between the stabilizer and disperse particles being the result of protolytic reaction between the two groups. The terms "acidic groups" and "basic groups" are as defined by Bronsted and Lowry, i.e. an acidic group is a species having a tendency to lose a proton and a basic group is a species having a tendency to add on a proton. The protolytic reaction between the two types of groups gives rise to specific associative forces between the stabilizer and the polymer particles. Such protolytic reactions include those commonly referred to as hydrogen bonding.

In the stronger protolytic reactions, the bond energy is the result of specific interaction between separate fixed charges, one in one polar group and another in the complementary polar group. Similar specific interaction arise between a pair of opposite charges, i.e. a dipole, in one polar group and a pair of opposite charges, i.e. a dipole, in the complementary polar group.

Where the reaction between stabilizer and disperse polymer is protolytic suitable types of acidic polar groups include —COOH, —SO$_3$H, —SO$_4$H, —PO$_4$H$_2$, =PO$_4$H and —PO$_3$H$_2$. The basic polar groups will be essentially of the type found in organic bases, e.g. those of the nitrogen base type will be generally of the structure

where R$_1$ and R$_2$ may be aryl, aralkyl, alkyl, cycloalkyl or hydrogen or, together, may form a ring structure which optionally may contain a hetero-atom and optionally may be saturated or unsaturated. Such basic groups include dimethyl amino, di-isopropyl amino, dihexyl amino, morpholino, piperidino, N-methylbenzyl amino and N-methyl phenyl amino. Other types of basic groups are those occurring in quaternary ammonium bases, substituted guanidine, substituted dicyandiamide, and substituted pyridine.

Where the interaction between the stabilizer and disperse polymer is between dipoles suitable dipolar groups include those present in nitrile, sulphone, nitro and ether oxygen groups, cyclic anhydrides and phosphate and sulphonate esters, and ion pairs existing in salts, e.g. phosphate and sulphonate salts, metal soaps of a fatty acid and metal soaps or quaternary ammonium salts of sulphated or phosphated fatty alcohol or zwitterions.

The bond energies of pairs of interacting polar groups will depend not only on the specific nature of the polar groups but also on the nature of the liquid in which the interaction takes place. The following is a list of representative systems arranged approximately in increasing order of bond energies determined as heats of reaction per mol group pair by the method later described.

| Interacting polar groups | | Medium |
|---|---|---|
| Ester carbonyl | Nitrile | Aliphatic hydrocarbon. |
| Do | Carboxylic acid | Aromatic hydrocarbon. |
| Do | Aliphatic hydroxyl | Do. |
| Nitrile | Nitrile | Do. |
| Ester carbonyl | Carboxylic acid | Aliphatic hydrocarbon. |
| Do | Aliphatic hydroxyl | Do. |
| Carboxylic acid | Carboxylic acid | Ester. |
| Aliphatic hydroxyl | Aliphatic hydroxyl | Do. |
| Carboxylic acid | Carboxylic acid | Aromatic hydrocarbon. |
| Do | Amine | Ester. |
| Aliphatic hydroxyl | Aliphatic hydroxyl | Aromatic hydrocarbon. |
| Alkyl hydrogen phosphate. | Amine | Ester. |
| Nitrile | Nitrile | Aliphatic hydrocarbon. |
| Carboxylic acid | Carboxylic acid | Do. |
| Do | Amine | Aromatic hydrocarbon. |
| Do | Aliphatic hydroxyl | Aliphatic hydrocarbon. |
| Aliphatic hydroxyl | do | Do. |
| Alkyl hydrogen phosphate. | Amine | Aromatic hydrocarbon. |
| Carboxylic acid | do | Aliphatic hydrocarbon. |
| Alkyl hydrogen phosphate. | do | Do. |
| Sulphonic acid | do | Ester. |
| Alkyl hydrogen sulphate. | do | Do. |
| Sulphonic acid | do | Aromatic hydrocarbon. |
| Alkyl hydrogen sulphate. | do | Do. |
| Sulphonic acid | do | Aliphatic hydrocarbon. |
| Alkyl hydrogen sulphate. | do | Do. |

An indication of the strength of the associative force available in the interaction between stabilizer and disperse polymer is given by the effective molar heat of interaction of the group in the stabilizer with the group to be used in the polymer particles. This is determined under the reaction conditions in which the dispersion is to be formed, the stabilizer being dissolved in the liquid and being interacted with a soluble compound containing the group to be used in the disperse polymer. Where the group to be used in the disperse polymer shows significant self-association or association with the liquid of the dispersion the value as determined above should be corrected for this by determining in a blank experiment the apparent heat of interaction (which may be negative) under the same conditions but in the absence of the stabilizer and subtracting this from the first determined value.

The soluble compound should be such that the polar group under test is, with respect to neighboring groups in the molecule, in an environment as similar as possible to that in the disperse polymer. For example, where the polar group is to be present in a disperse polymer made by addition polymerization, a suitable soluble compound for use in the above test would be the product of hydrogenating the double bond in the monomer to be used in the addition polymerization. Similarly, where the disperse polymer is to be made by condensation polymerization, a suitable soluble compound would be the product of reacting with a simple molecule the condensation reactive groups of the appropriate monomer or comer used in the condensation polymerization reaction; for example, a diol containing the polar group could be esterified with acetic acid.

The minimum bond energy useful in the interaction involved is about that represented by the first system given in the above list and when determined by the above test this provides a bond energy of about 0.5 kilocalorie per mole group pair. Preferably, however, the bond energy should be at least about 1.0 kilocalorie per mole group pair, this being provided, for example, by interaction of ester carbonyl groups with carboxylic acid in aliphatic hydrocarbon.

As is apparent from the above list, the energy or interaction of a particular pair of polar groups is dependent on the nature of the liquid in which the groups are interacted. In general, as the polarity of the liquid increases, the bond energy decreases and so, as stated above, the liquid of the dispersion must not be so polar as to inhibit the interaction and so prevent bonding of the stabilizer to the disperse particles.

Although, because of the practical difficulties inherent in calorimetry, the above list simply sets out various representative systems in an approximate relative order of bond energies without reference to absolute values as determined in any one particular laboratory, any system not specifically mentioned in the list can readily be tested and compared with the listed systems by the method described above.

The specific associative force resulting from the interaction between the polar groups in the stabilizer and disperse polymer may be, and usually is, solely or largely responsible for the association between stabilizer and disperse polymer, but in some particular types of stabilizer structure, e.g. those in which relatively non-solvated segments are located along a polymeric backbone, the relatively non-solvated segments may provide a supplementary mass-dependent associative force of the type described with reference to the prior art.

Where the interaction between the stabilizer and the disperse polymer is a protolytic one the disperse polymer may contain either the acidic group or the basic group and though the polymer may be a homo-polymer of a monomer containing such a group, the group is more conveniently incorporated in smaller proportions by co-polymerization of a suitable proportion of a co-monomer containing the group. The groups may be present in the disperse polymer in a proportion providing sufficient reactive sites for attachment of the stabilizer and, though the minimum required will vary with the nature of the stabilizer and possibly with the nature of the major co-monomer, in practice usually not more than 25% by weight of co-monomer incorporating the reactive group is required, from 0.5–5% by weight of the co-monomer being preferred.

Suitable co-monomers for introducing acidic reaction groups for association with the stabilizer include, in addition to the above-mentioned monomers containing a carboxyl group, those containing a sulphonic group, e.g. vinyl sulphonic acid and styrene sulphonic acid, and those containing a phosphate group such as vinyl phosphate and phosphonic esters of unsaturated OH-containing compounds such as the phosphonic ester of hydroxy isopropyl methacrylate. Suitable co-monomers for introducing basic reaction groups include vinyl pyridine, vinyl dimethylamine, N,N-dimethylaminoethyl methacrylate and tertiary butylamino ethyl(meth)acrylate.

As in the case of the other polar groups the dipolar groups are also conveniently introduced into the disperse polymer by a suitable co-monomer and in some cases the disperse polymer may consist essentially of a polymerized monomer containing a dipolar group.

Suitable co-monomers include acrylonitrile, acrylamide, maleic anhydride, vinyl methyl sulphone, methyl ester of vinyl sulphonic acid, dimethyl ester of vinyl phosphonic acid, dimethyl ester of vinyl phosphate, para-nitro benzoic acid ester of vinyl alcohol. In some cases the disperse polymer may be a homo-polymer of a dipole-containing monomer such as acrylonitrile.

Polymers prepared by condensation polymerization generally contain dipolar groups and/or terminal polar groups as a result of the condensation reactions and these can be made use of in the bonding of stabilizer to disperse particles of such polymers. However, where the dispersion is prepared by polymerization of monomers or comers in the presence of stabilizer, it is not usually possible to make use of protolytic interactions to provide the stabilizer bonding energy because of the likelihood of the polar groups in the stabilizer becoming involved in the condensation reaction. In these circumstances dipole interactions should be used to attach stabilizer to the polymer particles as they are formed. For example, a dispersion of a condensation polymer may be made by reacting hexamethylene diamine with an equimolar proportion of adipoyl chloride in a mixture of aliphatic and aromatic hydrocarbons in the presence of a stabilizing random copolymer of octa-decyl methacrylate and acrylonitrile (molar ratio 1:1, molecular weight about 20,000). In this case the stabilizer is bonded to the disperse particles by interaction between nitrile groups in the stabilizer and amide groups in the disperse polymer.

A dispersion of a polyester may be obtained by reacting terephthaloyl chloride and ethylene glycol in an aromatic hydrocarbon in the presence of a stabilizing random copolymer of octadecyl methacrylate and dimethylaminoethyl methacrylate (molar ratio 1:1, molecular weight about 35,000) which has been converted to a sulphobetaine derivative by reaction with propane sultone. In this case the stabilizer is bonded by interaction between the sulphobetaine zwitterions in the stabilizer and the ester carbonyl groups in the disperse polymer.

In general, conventional catalysts, initiators, chain transfer reagents, etc. may be used in the polymerization processes. In the case of addition polymerizations free radical initiators such as organic peroxides, hydroperoxides and bisnitriles, or ionic initiators such as Ziegler catalysts may be used (provided the polar group in the stabilizer or disperse polymer do not inhibit the action of the ionic initiator). In the case of condensation polymerization, fast non-equilibrium reactions are preferred, e.g. the reaction of acid chlorides with amino or hydroxyl compounds in the presence of suitable acid acceptor or the self-polymerization of lactones, lactams or cyclic ethers.

Dispersions may be made by forming the disperse particles of polymer in the organic liquid in the presence of the stabilizer. Preferably the particles are formed by polymerizing monomer or comers in the organic liquid to produce the polymer which, being insoluble in the liquid, forms disperse particles which become stabilized by the stabilizer.

In dispersion polymerizations the monomer and any co-monomer needed to provide the polar group in the disperse polymer and/or stabilizer may all be added at the beginning of the reaction or portions may be added at intervals or continuously during the reaction.

The amount of monomer or comonomer to be polymerized in the organic liquid will depend on the desired polymer content of the final dispersion.

Alternatively, the polymers may be made by bulk polymerization followed by comminution of the polymer and dispersion in the organic liquid.

As a further alternative, suitable polymer particles may be produced by aqueous emulsion polymerization. In such polymerizations, apart from the possibility of incorporating suitable polar groups in the polymer particles by polymerization of an appropriate monomer or co-monomer, as described in this patent specification, use may be made of the fact that in most cases polymer particles prepared by aqueous emulsion polymerization will have suitable polar groups stably attached thereto. These may arise from the use in the polymerization of an ionic stabilizer for the emulsion which becomes stably attached to the particles as a result of the stabilizer becoming involved in chain transfer reaction with the monomer during the course of the polymerization, e.g. salts of sulphonic acid derived from sales of alkyl aryl sulphonic acids or of sulphate half-esters derived from salts of alkyl sulphates or of partial esters of phosphoric acid derived from salts of partial alkyl phosphates or of carboxylic acid derived from salts of long chain fatty acids, or of bases derived from salts of long chain bases of quaternary bases derived from alkyl pyridinium salts.

For example, salts of sulphonated castor oil (sold as Calsolene oil and Turkey Red oil), salts of oleyl acid phosphate and similar surfactants used as stabilizers in emulsion polymerizations will have polymer chains grafted thereon during the course of the polymerization and so will become part of the resulting polymer particles. The salts themselves may be used as the polar group in the specific interaction or they may first be converted to the free acid or base and used as such.

Alternatively, an emulsion stabilizer containing polar groups can be stably attached to the particles during the aqueous emulsion polymerization by using one which contains unsaturated groups which will copolymerize with the monomer, e.g. salts of copolymerizable unsaturated acids or bases such as salts of vinyl sulphonic acid, (meth)acrylic acid, crotonic acid and maleic and maleic half-ester or salts of tertiary or quaternary unsaturated bases such as vinyl pyridine and dialkyl aminoalkyl (meth)acrylates.

As a further alternative, use may be made of polar groups in the disperse polymer particles derived from the inhibitor used in the aqueous emulsion polymerization. This source of polar groups is particularly useful where the monomer being polymerized does not readily chain transfer. In these cases most of the polymer chains in the particles will contain such polar groups, e.g. sulphate from ammonium or potassium persulphate initiator and carboxyl from 4,4-azobis-cyanovaleric acid initiator.

In other cases where the polymer particles have no suitable polar groups stably attached thereto, whether obtained by comminution or precipitation of polymer or by aqueous emulsion polymerization, suitable polar groups may be attached to the disperse particles in an aqueous phase, e.g. by sulphation of hydroxyl groups or sulphonation of aryl polymer chains in the surface of the polymer particles or in, say, a non-ionic stabilizer which has become attached to the particles as a result of chain transfer during an aqueous emulsion polymerization.

In the case of association involving acidic and basic groups, where the protolytic reaction is strong as represented by the reaction between an acid phosphate group and an amine group in aliphatic hydrocarbon, one acidic or basic group per stabilizer molecule may be adequate to provide the necessary associative force. In the case of weaker protolytic reactions, as represented by interaction between a carboxylic group and an amine group in aliphatic hydrocarbon, it will be necessary to incorporate more than one acidic or basic group in the stabilizer molecule in order to provide the necessary associative bond between stabilizer and particle. Similar considerations apply in the case of dipole association. However, when the stabilizer contains more than one polar group it is not always the case that on reaction with the disperse particle the resultant associative force is the total of the associative force developed by the groups separately. The most effective groups from the point of view of bond strength are those which are not subjected to interference from adjacent like groups and which are orientable for reaction with a complementary group in the polymer particle. Consequently, where a multiplicity of reactive groups is present in a stabilizer molecule these should, as far as possible, be so spaced in the molecular structure as to avoid mutual interference.

In addition to these general characteristics which are common to both seed stage and feed stage stabilizers, the copolymerizable seed stage stabilizer must provide at least one polymerizable ethylenic double bond per stabilizer molecule for polymerization with monomer comprising the disperse polymer, whereas the feed stage stabilizer is preferably free of such double bonds. Thus suitable copolymerizable seed stage stabilizers are those stabilizers which enter into a copolymerization reaction with the disperse polymer to provide from 1–10, preferably from 1–4 covalent links therewith per co-reacted stabilizer molecule.

The required chemically reactive groups may be introduced into the stabilizer molecule by copolymerizing therein suitable $\alpha,\beta$-ethylenically unsaturated monomer containing such groups. Suitable monomers have already been discussed above with reference to the disperse polymer. An indirect method of introducing a suitable group is to utilize a reactive group of a nonpreferred type present in a stabilizer by modifying the group so as to introduce the desired reactive group. For example an epoxide ring provided by the stabilizer may be reacted with e.g. methacrylic acid to introduce into the stabilizer molecule a double bond capable of copolymerizing with monomer from which the disperse polymer is formed, during the dispersion polymerization process. The epoxide ring itself may have been introduced into a stabilizer by co-polymerizing therein a minor proportion of a suitable monomer, e.g. glycidyl methacrylate.

The number of reactive groups to be provided by each stabilizer molecule is related to the type of reaction and reaction conditions, for example reaction temperature and relative concentrations of stabilizer and disperse polymer, under which the ro-reaction is to take place. While each stabilizer molecule must provide at least one reactive group for co-reaction with the disperse polymer, we limit the maximum number of such groups present in the molecule so that under the chosen co-deaction conditions not more than 10 covalent bonds form between each co-reacted stabilizer molecule and the disperse polymer. This can be achieved in two ways. The maximum number of reactive groups per stabilizer molecule can be limited to 10 or having established the efficiency of co-reaction of a particular stabilizer disperse polymer system the number of reactive groups per stabilizer molecule can be adjusted to provide the required number of covalent links. It will be appreciated that it is not normally practicable, nor is it necessary, for each stabilizer molecule which so reacts to form the same number of covalent bonds with the disperse polymer. In particular, a minor proportion, for example 5–10%, of the reacting stabilizer molecules may form more than 10 covalent bonds with the disperse polymer, when the stabilizer provides a sufficient number of reactive groups; which is a normal limitation on the accuracy with which polymer reactions can be specified.

In general, when a substantial proportion of the stabilizer molecules form more than 10 covalent links with the disperse polymer, stable, non-coagulated dispersions are difficult to form and we limit our invention accordingly. The facility with which stable dispersions can be prepared usually increases as the number of covalent bonds formed per stabilizer molecule decreases and we have found that provided each reacted stabilizer molecule forms from 1–4 covalent bonds with the disperse polymer, dispersions of high stability are readily formed. Accordingly our preferred stabilizers are those which when co-reacted have from 1–4 covalent bonds per stabilizer molecule with the disperse polymer.

A stabilizer may be modified as described above before the dispersion polymerization reaction is carried out.

Alternatively, modification of the selected stabilizer may be carried out after the dispersion polymerization process is completed. For example association between the stabilizer and the disperse polymer may be the result of interaction between amide groups in the stabilizer and hydroxyl groups in the disperse polymer. Covalent links between the stabilizer molecules and disperse polymer are then formed by first converting the amide groups to e.g. methoxy ethyl derivatives and then reacting these ether groups with hydroxyl groups of the disperse polymer.

The dispersions of this invention are formed by the dispersion polymerization of $\alpha,\beta$-ethylenically unsaturated monomer in the inert organic liquid in the presence of the stabilizer, which initially is in solution in the liquid. Conventional polymerization initiators, chain transfer agents, etc. may be used in the dispersion polymerization process provided they do not interfere with the reactive groups which must react to provide the chemical link between the stabilizer and the disperse polymer.

As stated above the stabilizer and disperse polymer may be covalently linked during the dispersion polymerization process by a copolymerization reaction. When the co-reaction between the stabilizer and the disperse polymer is an addition reaction, the co-reaction is carried out at the completion of the dispersion polymerization process, when it is initiated, for example, by raising the temperature of the dispersion and/or by the addition of an appropriate catalyst. Another method, in which modification of the stabilizer and the formation of covalent links between the stabilizer and the disperse polymer takes place simultaneously is to co-react chemically reactive groups, which may be of the same type, in both the stabilizer and disperse polymer with a reactive bridging compound. For example a disperse polymer providing epoxy groups may be stabilized in an inert organic liquid by a stabilizer which also provides epoxy groups, the association of stabilizer with disperse polymer being the result of polar interaction between the respective epoxy groups. On addition of a diamine for example ethylene diamine, covalent links are formed between the stabilizer, and disperse polymer through the diamine bridging compound.

While it is desirable in order to achieve the maximum utilization of stabilizer for all stabilizer molecules present in the dispersion to be covalently bonded to the disperse polymer, in practice factors such as, for example, steric hindrance and reaction equilibria, make this difficult to achieve. It is sufficient for the performance of this invention if substantially all of the stabilizer molecules are co-reacted with the disperse polymer. For example the concentration of stabilizer used in the dispersions can be from 3 to 40% by weight of disperse polymer. When a relatively low concentration of stabilizer is used in the dispersion and in particular when the co-reaction between stabilizer and disperse polymer is a copolymerization reaction, 80 to 90% of the stabilizer may be so reacted. On the other hand, when the co-reaction is an addition reaction and in particular when relatively high concentrations of stabilizer are used in the dispersion, the achievable proportion of co-reacted stabilizer may be of the order of 60 to 70%.

When the inert organic liquid comprises at least one liquid which is a non-solvent for the disperse polymer in combination with at least one other liquid of lower volatility than the non-solvent liquid and which in addition is a solvent for the disperse polymer, we prefer to carry out the dispersion polymerization in the non-solvent liquid, optionally in the presence of a minor proportion, e.g. up to 10% by weight, of a liquid which is per se a solvent for the disperse polymer. The balance, if any, of solvent liquid required in the completed dispersion is then added gradually and preferably at room temperature to the dispersion after stabilizer and disperse polymer are covalently linked.

The feed stage polymeric stabilizer may be selected from a broader range of materials than the seed stage stabilizer. Although the same stabilizer may be used in both the seed and feed stages of the process, in general, having regard to the desirability of providing a robust process which is relatively insensitive to normal fluctuations in control conditions, we prefer that copolymerizable stabilizer shall not be used in the feed stage. That is, stabilizers which otherwise resemble the above-described copolymerizing type but from which polymerizable double bonds have been omitted are the preferred feed stage stabilizers. Suitable stabilizers are those disclosed in U.S. Pat. No. 3,514,500 and as hereinafter described.

Stabilizers suitable for use in stabilizing dispersions of particles in an organic liquid in which the particles are insoluble comprise at least one component which is solvatable by the liquid and at least one other component of different polarity which is relatively nonsolvatable by by the liquid, the solvatable component having a molecular weight of from 500 to 5,000, the non-solvatable component having a molecular weight of at least 250 and the total weight ratio of solvatable component to non-solvatable component being from 0.5:1 to 5:1, respectively, the stabilizer being obtained by condensation reaction between (i) a compound (A) which has a molecular weight of from 500 to 5,000 and is solvatable in the liquid and contains a group capable of condensation reaction and (ii) a compound (B) which has a molecular weight of at least 250, is of a different polarity from the compound (A), and contains a group capable of condensation reaction with the group of compound (A). Compound (A) provides the solvated component and compound (B) provides the anchor component of the stabilizer.

Preferably the weight ratio of solvated component to anchor component is from 0.5:1 to 2:1, respectively, more preferably about unity.

In a further preferred form the anchor component has a minimum molecular weight of 500.

While stabilizers containing solvated components of molecular weight as low as 1,000 have previously been proposed, these have been made in such a way that the non-solvated anchor component had a molecular weight of at least an order of magnitude greater, i.e. 10,000 or more. This relationship between a large anchor component and a much smaller solvated component resulted in the desired objective of firmly associating the stabilizer with the disperse polymer particles. However, if the stabilizer is irreversibly attached to the particle surface, a disadvantage results. In stabilized dispersion polymerization, the polymer particles grow by polymerization of monomer on the surface of the particles, the new outer layers of polymer as they are laid down blanket the stabilizer on the underlying surface and further stabilizer must be made available to stabilize the new outer surface of the particles. In other words, as the disperse polymer particles grow, stabilizer is buried and wasted inside them.

This is an important factor where the dispersants are to be used in polymer dispersions for coating compositions. In this case in particular, it is highly desirable to keep to a minimum the proportion of stabilizer used since, although it is designed to be compatible with the main film-forming polymer, it can have an adverse effect on the properties of the final film.

The selected stabilizers can be more efficiently used and this more efficient usage of the new stabilizer is particularly important in the preparation of very fine particle size dispersions, e.g. those as small as 500 or 1,000 A. The weight proportion of stabilizer needed for stabilization is dependent on the surface area of the disperse material. In very fine dispersions, the surface area of the particles to be stabilized in relation to the weight of the particles is so large that, with the previous polymeric stabilizers, unacceptably large weight proportions were required to stabilize very fine dispersions. Using the selected stabilizers of this invention, the weight proportion can be reduced.

The stabilizers may contain more than one unit of solvatable component per molecule though preferably where the weight ratio of solvatable component to anchor component is greater than 2:1, the stabilizer should not contain more than two solvatable components per molecule. They are conveniently made in solution in an organic liquid by reacting by a condensation reaction the solvatable compound (A) containing a reactive group of one type with the compound (B) of different polarity containing one or more complementary reactive groups. In this way, there may be attached to the anchor component (derived from compound (B)), either one or a selected number of solvatable components, the number depending on the functionality of the compound (B) and the molar proportions reacted. Stabilizers containing on average a higher number of units of solvatable component per molecule may be made by reacting higher molar proportions of mono-functional compound (A) with compound (B) of suitably high functionality.

In order to achieve most efficient usage of stabilizer, the molecular weight of the solvated component should be selected according to the average size of the particles to be stabilized in dispersion. Where the particle size is to be very small say 500–100 A., the solvated component should have a molecular length of about 35–40 A. In a fully extended molecule, and this is desirably the condition of the solvated component in the liquid in which the stabilizer is used, this would be equivalent to a chain of about 35–50 covalent C—C links. This equivalence of length is not substantially altered by the occasional presence of other atoms, e.g. 0 in the chain. If the solvated component molecule is essentially a polymethylene chain, 35 links would give a molecular weight of about 500. However, the chain need not necessarily be a purely C—C chain, it may also contain non-carbon links.

When larger sized particles are to be stably dispersed, the molecular length of the solvated component should be increased in direct proportion to obtain most efficient results, until the solvated component reaches its maximum molecular weight of 5,000. Preferably the molecular weight of the solvated component is at least 650.

Where the stabilizer is to be made in solution by a condensation reaction in which a reactive group in the compound (A) is reacted with a complementary group in the compound (B), typical condensation reactions are those which give rise to the following links between the two compounds:

(i) Ester links, especially when formed by ester-interchange or by a reaction such as carboxyl/glycidyl or hydroxyl/acid chloride or hydroxyl/acid anhydride.
(ii) Ester links, especially when formed by addition reactions between alkylene oxides and hydroxyl.
(iii) Amide links, especially when formed by amine/acid chloride reaction.
(iv) Urethane links, especially when formed by reaction of isocyanate with hydroxyl groups.

in order to avoid the possibility of cross-linking, it is preferred that at least one compound should behave substantially mono-functionally in such reactions.

When the stabilizer is to be used in dispersions in non-polar organic liquid such as aliphatic and aromatic hydrocarbons and long chain ketones and alcohols, the solvatable component should likewise be non-polar. Where the stabilizer is to be used in dispersions in polar organic liquid, such as alcohols, ketones and esters, the solvatable component should likewise be polar. A simple test of solvatability by any particular liquid is that the component per se before incorporation into the stabilizer should be completely soluble in that liquid.

Solvatable compounds (A) containing a group reactable in a condensation reaction as listed above may be made for example by condensation reactions producing a polyester or polyether. Preferably the polyester reaction is a simple one involving a mono-hydroxylic mono-carboxylic monomer, such reactions leading to compounds (A) which are strictly mono-functional with respect to one or the other group. The most convenient monomers to use are hydroxy acids, particularly α,ω- or approximately α,ω-acids. For example, a hydroxy fatty acid such as 12-OH stearic acid may be polymerized to form a non-polar compound (A) solvatable by such non-polar organic liquids as aliphatic and aromatic hydrocarbons and long chain ketones. Similarly a hydroxy acid such as lactic or glycolic acid may be polymerized to form a polar compound (A) solvatable by esters and short-chain ketones. Some naturally occurring compounds also contain solvatable components useful in the stabilizers of this invention. For example, non-polar long chain polyesters of hydroxy fatty acids are found in some natural waxes such as carnauba.

Somewhat more complex, but still useful, polyesters may be made by reacting diacids with diols. For example, 1,12-decane diol may be reacted with sebacic acid or its diacid chloride to form a compound (A) solvatable by aliphatic hydrocarbons, or neo-pentyl glycol may be reacted with sebacic or adipic acid to form a compound (A) solvatable by aromatic hydrocarbons or fatty esters. Such polyesters are of a more random constitution than the simple ones referred to above and are usually more polar because of their higher ester content. Other polyesters are the polycarbonates which may be made, for example, by reacting phosgene with a mixture of difunctional and mono-functional alcohols to produce a compound (A) solvatable by ketones and aromatic hydrocarbons and having a terminal chloroformate group which can be reacted with a complementary hydroxyl or amine group in a condensation reaction.

Even more complex esters are exemplified by non-drying oil-modified alkyd resins, these being useful because of their non-polar characteristic imparted by the modifying oil which makes them solvatable by common and cheap liquid hydrocarbons. These may be made by reacting a polyol such as glycerol or pentaerythritol with a polybasic acid such as phthalic, sebacic or adipic acid and a non-drying oil or long chain fatty acid derived therefrom. The polyester is reacted to an acid value of about 5 to 30 and a stabilizer may be produced therefrom by, for example, reacting it with an epoxy resin in the proportion of one mole of resin to each estimated carboxyl group in the polyester. There more complex esters can be polyfunctional in such reactions and so the resulting stabilizer can have more than one anchor component attached to the solvatable component.

Polyethers containing a reactive group may also be made by a variety of condensation reactions. For example, propylene oxide may be condensed to form a compound (A) containing a hydroxyl group and solvatable by ketones and esters and ethylene oxide may be condensed to form a similar compound (A) solvatable by highly polar liquids such as alcohols.

Solvatable components of suitable molecular weight may also be made by condensation or addition reactions involving a telomer which not only controls the molecular weight of the polymer but also provides the reactive group used in the subsequent condensation reaction. For example, suitably short non-polar polymeric chains of monomers such as lauryl or stearyl methacrylate or octadecene may be made in this way by polymerization in chlorinated hydrocarbon followed by hydrolysis to produce terminal reactive groups. Polar polymer chains may be made using methyl methacrylate or vinyl pyrrolidone in similar manner.

Ionic polymerization reactions may also be used to form the compound (A). For example, non-polar hydrocarbon polymers can be formed in this way, and the reactive group therein may be provided by termination using carbon dioxide which provides a carboxyl group, or water or oxygen, which produce a hydroxyl group.

The anchor component of the stabilizer must be of different polarity to the solvatable component so that it is relatively non-solvated by the liquid phase of the dispersion. A simple test of non-solvatability by any particular liquid in which the stabilizer is to be used is that the compound (B) per se before incorporation into the stabilizer should be insoluble in the liquid, though, of course, it will be readily understood that the stabilizer as a whole should not be completely insoluble in the liquid in which it is to be used.

Where the stabilizer contains only one or a few units of solvatable components per molecule then in order to meet the weight ratio requirements the anchor component is also of relatively low molecular weight and so compound (B) may be produced by methods similar to those outlined above for the solvatable compound (A), the main differences being that it must be of different polarity to that of the solvatable compound (A) and must contain a complementary reactive group. For example, the compounds described above as being solvatable by polar liquids such as ketones, esters and alcohols, will generally be relatively non-solvated by non-polar liquids such as aliphatic hydrocarbons and so can be used as anchor components in stabilizers for use in such liquids, and vice versa.

In addition, useful anchor components which are relatively non-solvated by liquids ranging from aliphatic hydrocarbons to esters are provided by epoxy resins such as those made by condensing epichlorhydrin with diphenylol propane.

Where the stabilizer contains many units of solvatable component per molecule then the anchor component must be of correspondingly higher molecular weight and preferably an addition polymer. Such stabilizers may be made by a condensation method in which compound (A) containing one type of reactive group is reacted with an addition polymer containing per molecule the appropriate number of complementary reactive groups. These reactive groups may be introduced into the addition polymer by random copolymerization of the main monomer with a minor proportion of a co-monomer containing the reactive group.

Where the backbone of the stabilizer is an addition polymer then, for example, polymer based on methyl methacrylate as the main monomer would be suitable in an aliphatic hydrocarbon liquid, a polymer based on acrylonitrile as the main monomer would be suitable in an aromatic hydrocarbon liquid and a polymer based on styrene as the main monomer would be suitable in a polar organic liquid.

These three polymers are merely illustrative of a range extending from polar to non-polar polymer. Other typical polymers include polymers of acrylic and methacrylic acids, esters, nitriles and amides of such acids, vinyl alcohol and derivatives such as chloride, acetate, chloracetate and stearate, vinylidene chloride, styrene and derivatives such as vinyl toluene, α-methyl styrene and divinyl benzene, butadiene and others. In order to introduce reactive groups the polymer may be the product of a mixture of monomers, for example, methyl methacrylate with a minor proportion of methacrylic acid or glycidyl methacrylate, or styrene with a minor proportion of allyl alcohol or allyl glycidyl ether.

Broadly there are three types of systems (1) where the polymer is non-solvated because it is polar relative to the organic liquid, (2) where the polymer is non-solvated because it is non-polar relative to the organic liquid, (3) where the polymer is non-solvated by all common organic liquids because of its molecular structure and irrespective of any question of relative polarity.

Systems typical of the first case are those in which the organic liquid is of a non-polar nature, the most common liquids of this type being aliphatic hydrocarbons, such as white spirit (an aliphatic/aromatic hydrocarbon), and iso-octane. With slightly more polar organic liquids, such as aromatic hydrocarbons, fatty esters and fatty ketones, very highly polar polymers may be used. The organic liquid may, of course, be a mixture.

Suitable polar polymers for use in systems of the first type include as the main monomer esters of unsaturated acids with lower alcohol, e.g. acrylic, methacrylic and ethacrylic acid esters of methyl, ethyl and butyl alcohol. In homopolymers of such esters, butyl alcohol would be the highest alcohol which can be used but this ester can be used as a co-monomer with a more polar monomer. This will usually be the case where the stabilizer is made by a condensation reaction since, as described above, the anchor polymer must then contain reactive groups provided by a minor co-monomer and these are usually more polar in nature. Higher alcohols, e.g. octyl and lauryl, can be used provided the polymers also contain an additional polar group to compensate for the longer non-polar carbon-carbon chains. For example, the esters may be co-polymerized with a minor proportion of a highly polar monomer such as acrylic or methacrylic acid. Monoesters of glycols having a free hydroxyl group may be used, the hydroxyl group providing an additional polar effect. These carboxyl and hydroxyl groups may be used to link the side chains to the preformed anchor polymer by the condensation reaction.

A further alternative is to have present in the alcohol an amino group as, for example, in methanolamines and ethanolamines, an oxirane ring as in glycidyl compounds, or a free carboxylic group as in a hydroxy acid such as citric acid.

A similar type of polar polymer is produced from, as main monomer, a monomeric ester or ether of an unsaturated lower alcohol such as vinyl alcohol.

The esters may be of hydrofluoric acid and lower acids such as acetic, chloracetic, propionic and formic. Where higher acids are used then they should in any case also contain an additional polar group to produce a sufficiently polar polymer, for example, the acid may be a dicarboxylic acid, such as oxalic, in which the second carboxylic group is left free. Alternatively, the acid may contain a hydroxyl group, e.g. lactic or citric acid, the hydroxyl group being left free. Or the acid may contain an amino group, e.g. glycollic acid may be used, the amino group providing the additional polarity required.

Similar principles are applicable where the main monomer is an ether of unsaturated lower alcohols. The ether may be a simple ether of a lower alcohol such as methyl or ethyl alcohol. Reactivity may be introduced by using a reactive co-monomer or alternatively, by using an ether of a di- or tri-hydroxy alcohol of which a hydroxyl group is left free. Alternatively, the ether may be of a dimethyl ethanolamine or diethyl ethanolamine or of a glycidyl compound.

Another type of polar polymer is produced by polymerizing an acid, such as acrylic or methacrylic. Alternatively, polar derivatives such as acid chlorides, amides, methylolamides, may be polymerized. Such monomers give particularly non-solvatable polymers and are suitable for copolymerizing with monomers which, by themselves, would not produce a satisfactorily non-solvatable polymer.

In the second type of system, the organic liquid of the dispersion is polar, e.g. methanol, ethanol, acetone, glycol, and in extreme cases, dimethyl formamide and methyl formate. Such polar organic liquids may contain a minor proportion of water. In this type of system the non-solvated polymer is relatively non-polar.

Polymers of main monomers such as styrene, vinyl toluene, divinyl benzene, diisopropenyl benzene, isoprene, butadiene, isobutylene and ethylene, are suitably non-polar.

Other non-polar polymers are those in which the main monomers are higher fatty esters of unsaturated acids such as acrylic, methacrylic and ethacrylic acids. In these cases, the alcohol component of the ester contains a long carbon-carbon chain to produce a polymer of suitable non-polarity. Cetyl alcohol is a typical alcohol. Lauryl alcohol is about the lowest alcohol which can be used in homopolymer esters and preferably esters of this alcohol are used as co-monomers with more non-polar monomer. In addition, one can use partial long-chain esters of a polyol, e.g. glyceryl distearate, dilaurate, or dibehenate, the remaining hydroxyl of the glycerol being esterified with the unsaturated acid.

Alternatively, one can use as main monomers in this second type of system higher fatty esters or ethers of unsaturated alcohols such as vinyl and allyl alcohol. Suitable acid components of such esters are stearic acid, behenic acid and mono-esters of dibasic acids such as cetyl or lauryl adipate or sebacate.

Suitable ethers are those of cetyl alcohol or of glycerol distearate, dilaurate or dibehenate.

In general, in this second type of system the polymer is non-solvated by reason of it containing long carbon-carbon chains.

In the third type of system, the organic liquid may be of any polarity, e.g. aliphatic hydrocarbon, benzene or ethyl acetate. In this case, the polymer is non-solvated irrespective of its relative polarity. Such polymers include, for example, those of vinyl chloride, vinylidene chloride an acrylonitrile.

Again in these second and third types of components any necessary reactive groups can be introduced by using a minor proportion of a co-monomer containing such a group.

Where the stabilizer is to be used for stabilizing dispersions of polymer particles for use in coating composition the polymer backbone of the stabilizer should be compatible in the final coating film with the originally dispersed polymer. To achieve this it is preferred that the backbone and the disperse polymer be derived from the same or similar monomers. In any case, the principles laid down above for relating backbone polymer to liquid may also be applied to disperse polymer.

The stabilizer may consist essentially of a solvated homopolymer or random or ordered copolymer chain along which the polar groups are spaced. The polymer chain may be branched in which case the polar groups may be spaced along a solvated terminal crossbranch or side branch provided that the main chain extends the necessary minimum length from such branch to provide the solvated steric barrier.

The stabilizer may consist essentially of a segmented polymer. Subject to the limitation that the stabilizer as a whole must be soluble in the organic liquid of the dispersion, one or more of the segments may be relatively non-solvated, these segments alternating with or being distributed along solvated segments.

In a preferred form the stabilizer structure is one in which a plurality of pendant solvated chain-like components are attached to a polymeric backbone which has distributed along it a plurality of polar groups for interaction with the disperse polymer. The polar groups may form part of the backbone or may be attached to it. An advantage of this structure is that where the polar groups are such that they provide with complementary polar groups in the polymer bond energies of from about that corresponding to the interaction of nitrile group with nitrile group in aliphatic hydrocarbon to about that corresponding to the interaction of alkyl hydrogen phosphate with amine in aliphatic hydrocarbon and are distributed along the backbone at an average spacing of no more than about 10 covalent (or equivalent) links, the configuration of the preferred structure is such that it is essentially the solvated segments pendant from the backbone which provide the stabilizing solvated steric barrier and, therefore, can have a molecular length as short as 12 A. In an extended condition, and this is desirably the condition of the solvated chain-like component of the stabilizer when in use, a length of 12 A. is equivalent to a chain of about 12 covalent links. Preferably the solvated chain-like component is at least 16 A. in length which is equivalent to about 16 covalent links.

The solvated chain-like components attached to the backbone can be of molecular weight up to 1,000 and, particularly in those cases where the backbone is relatively solvated, the molecular weight can be higher. The chain-like components attached to a backbone are not necessarily all of the same length. The suitable spacing of the solvated components along the backbone will depend on their length. In general, the spacing of the solvated components should be of the order of their root mean square dimension, preferably from half to twice this dimension. For example, where the solvated components are $C_{12}$–$C_{15}$ hydrocarbon chains, and so in a hydrocarbon liquid have an extended length of about 12–15 A., these would have root mean square dimensions of about 6 A. and so should be distributed along the backbone at an average spacing of about 4–6 links; i.e. where the backbone is prepared by addition polymerization the frequency of the solvated chains on average will be one per 2 or 3 monomer units forming the backbone.

Similarly, where the solvated components are condensation products of 12-hydroxy stearic acid and stearic acid in a mole ratio of 2:1 respectively and have a molecular weight of about 1,000, their extended length will be about 50 A. and their effective root mean square dimension will be about 20 A. They should, therefore, be distributed along the backbone at an average spacing of about 20 A., i.e. where the backbone is prepared by addition polymerization at about an average spacing of one solvated component per 10 monomer units.

A preferred stabilizer of this type is one having at least 10 solvated components of average molecular weight not more than 1,000 attached to a backbone carrying at least 10 polar groups, the number of solvated components to polar groups being in a proportion of from 1:3 to 3:1.

The polar groups and solvated components are usually separated entities, the solvated components being attached to the backbone and the polar groups being carried in or on the backbone. However, in some cases the polar groups and solvated components may be attached one to the other. For example, the solvated components may be attached to the backbone by ionic linkages which also provide a dipole for specific interaction with the disperse polymer.

In general, the embodiment using a stabilizer comprising a backbone carrying a plurality of polar groups and of solvated components is preferred because of its greater efficiency. Efficiency can be further improved by using the shorter solvated components when the polymer is finely dispersed, e.g. in particle sizes of less than 0.1–1.0 and the longer solvated components when the polymer particles are larger, e.g. of size greater than 0.1–1.0, and a thicker steric barrier is required to prevent flocculation of the particles.

The nature of the backbone itself is not narrowly critical, its primary function being to provide a supporting structure for the chain-like components and polar groups. The important factor is that it must not contain atoms or have attached to its groups or substituents which, despite the presence of the solvated chain-like components along the backbone, cause the backbone to be in a collapsed or closely coiled state in the organic liquid of the dispersion. The frequency of the distribution of the solvated chains along the backbone ensures that even if the backbone itself is relatively non-solvated by the organic liquid of the dispersion, the steric reaction between the solvated chains attached thereto tends to maintain the backbone in a sufficiently extended condition to reduce substantially interference between the polar groups attached thereto. The preferred stabilizer structure is one in which the polar groups are freely able to orientate. The preferred conditions for multiple interaction of polar groups would not be met, for example, in a block or graft copolymer stabilizer of the prior art in which a solvated polymeric component is attached to a relatively non-solvated polymeric component associated with the polymer particles; in this case the associated polymeric component, being relatively non-solvated by the organic liquid of the dispersion, is in a collapsed or coiled condition and any polar groups on this polymeric component would be in fixed relative orientation in close proximity to each other. This would result in mutual interference between the groups and most of them would be deprived of the opportunity of interacting with complementary groups in the disperse polymer.

Since the liquid of the dispersion is organic the backbone is preferably an organic polymer chain though if suitably modified by organic groups attached thereto, inorganic polymer chains may be used. Thus the chain, which may be linear or branched, may consist of carbon atoms alone or carbon atoms linked with one or more hetero atoms, in particular oxygen, nitrogen, sulphur, phosphorus, silicon and boron; alternatively, it may consist of a series of pairs of P-O groups, Si-O groups, Ti-O groups, or B-O groups. It may be formed by addition polymerization or by condensation reactions or by specific polar interaction.

As stated above, the prime requirements in all cases are that the stabilizer as a whole be soluble in the inert liquid, and consequently it must consist at least in part of chain-like segments or components which are solvated by the liquid, and that it contains polar groups in a configuration in which they can interact with complementary polar groups in the disperse polymer.

Where the organic liquid of the dispersion is mainly aliphatic hydrocarbon in nature, e.g. pentane, hexane, heptane, and octane, the following are examples of suitable chain-like components which would be solvated by the liquid:

long paraffinic chains such as occur in stearic acid;
self-polyesters of —OH fatty acids such as 12-OH stearic acid or the polyesters occurring in carnauba wax;
polyesters of di-acids with diols, e.g. polyesters of sebacic acid with 1,12-dodecane diol or of adipic acid with neopentyl glycol;
polymers of long chain esters of acrylic or methacrylic acid, e.g. stearyl, lauryl, octyl, 2-ethyl hexyl and hexyl esters of acrylic or methacrylic acid;
polymeric vinyl esters;
polymers of butadiene and isoprene and noncrystalline polymers of ethylene and propylene.

The organic liquid may, of course, be a commercially available hydrocarbon mixture, such as mineral spirits and white spirit, which also are suitable. Where the organic liquid is mainly aromatic hydrocarbon in nature, e.g. xylene and xylene mixtures, benzene, toluene and other alkyl benzenes and solvent naphthas, similar solvatable components may be used and, in addition, shorter chain analogues, e.g. polymers of ethoxy ethyl methacrylate, methyl methacrylate and ethyl acrylate. Other components suitable for use in this type of organic liquid include:

aromatic polyesters, e.g. non-drying oil-modified alkyd resins;
aromatic polyethers;
aromatic polycarbonates; and
polymers of styrene and vinyl toluene.

Where the organic liquid is weakly polar in nature, e.g. a higher alcohol, ketone or ester, suitable solvatable components include:

aliphatic polyethers;
polyesters of short chain acids and alcohols;
polymers of acrylic or methacrylic esters of short chain alcohols.

Bearing in mind that the organic liquid must be inert, it may also be selected from liquids of greater polarity, e.g. a lower alcohol, ketone, or ester. Where the interaction between stabilizer and disperse polymer is protolytic the liquid should be one which is not substantially involved in the reaction and preferably it is an aprotic liquid. Where the interaction is between dipoles, the dipole moment of groups in the organic liquid should be low compared with dipole moment of the groups involved in the stabilizer/disperse polymer interaction.

Where the liquid is polar the chain-like component to be solvated should also be polar, but again, bearing in mind the fact that it will contain polar groups, it also should be selected with a view to avoiding serious interference by these polar groups with the stabilizer/disperse polymer interaction. The most suitable polar components are those containing in their molecule a larger number of weakly polar groups, e.g. poly(lower alkyl ether), poly(lower alkyl vinyl ether), polyvinyl alcohol, poly(hydroxy alkyl methacrylates), poly(acrylic esters of glycol monoalkyl ethers), and cellulosic ethers and esters.

Stabilizers containing one solvatable polymeric chain-like component and one strongly reactive polar group may be produced, for example, by the process of Pat. No. 3,390,206 in which, say, polylauryl methacrylate having a terminal carboxyl group is made by polymerizing the monomer in the presence of $\gamma,\gamma'$-azobis($\gamma$-cyanovaleric acid) and thioglycollic acid. The carboxyl group may be converted to the corresponding acid chloride and this in turn may be reacted with an amino sulphonic acid such as meta- or para-amino benzene sulphonic acid, amino naphthalene sulphonic acid, or N-methyl taurine. Alternatively, a corresponding hydroxyl-terminated polymer chain may be sulphated to produce a terminal acidic group. A similar stabilizer with a terminal acidic group may be produced, for example, by polymerizing dodecyl methacrylate as a dispersion in water using a persulphate salt as initiator, the dispersion then being acidified with sulphuric acid to coagulate the disperse polymer and convert the sulphate end groups to free acid groups.

Further, the process of the above-mentioned patent may be used to prepare polymer chains terminated by basic groups, e.g. by polymerizing the monomer in the presence of $\alpha,\alpha'$-azobis($\gamma$-amino-$\alpha,\gamma$-dimethyl valeronitrile) and $\beta$-mercapto ethylamine hydrochloride.

Stabilizers may also be produced by random copolymerization of a main monomer which will provide the chain-like component with a minor proportion of a monomer containing the desired reactive group. By suitable adjustment of molecular weight and co-monomer proportions, stabilizer containing statistically one or, at will, more reactive group per molecule can be produced. Suitable main monomers for production of solvatable polymers are exemplified above. Co-monomers which will provide acidic or basic polar groups are, in general, similar to those usable as described above for introduction of those polar groups into disperse polymer made by addition polymerization. For example, co-monomers which will provide basic reactive groups include dimethyl aminoethyl methacrylate, 4-vinyl pyridine and t-butyl aminoethyl acrylate, using, say, azodiisobutyronitrile as initiator. The polymerization may also be carried out in the presence of a chain transfer reagent such as octyl mercaptan. Acidic groups may be introduced using appropriate co-monomer.

Another method is to use as co-monomer one containing a group which can be reacted with another compound to introduce the desired acidic or basic polar group. For example, one can use a co-monomer containing an epoxide group, e.g. glycidyl methacrylate, and then esterify the epoxide groups with an amino acid, e.g. meta- or para-amino benzoic acid or -amino caproic acid. Alternatively, one can use a co-monomer containing an acidic group, e.g. acrylic or methacrylic acid, or a derivative such as an acid chloride group, these groups then being reacted with an amino compound such as N,N-dimethyl amino ethanol or N',N'-dimethyl ethylene diamine. Corresponding stabilizers containing one or more acidic polar groups per molecule can be produced in analogous ways by selection of an appropriate co-monomer. For example, copolymers containing one or more hydroxyl groups may be sulphated with oleum, or copolymers containing one or more epoxide groups may be treated with phosphoric acid or monohydrate sulphuric acid to introduce the acidic reactive polar group. As a further alternative a copolymer containing acid anhydride groups, e.g. a vinyl toluene/maleic anhydride copolymer may be reacted with an amino sulphonic acid or a copolymer containing one or more benzene groups, e.g. a dodecyl methacrylate/styrene copolymer may be sulphonated to provide acidic reactive groups.

Similar general considerations apply to the preparation of stabilizers in which the polar group is a dipole and in particular stabilizer chains containing a plurality of dipolar groups may be made by random copolymerization methods using dipole-containing co-monomers as described above with reference to methods of introducing such groups into the disperse polymer.

Where solvatable polymeric chain-like component is made by condensation reactions this may be, for example, a self polyester of 12-hydroxy stearic acid of molecular weight about 3,000, this being reacted with propane sultone to introduce a terminal sulphonic acid group. A similar stabilizer containing two strongly polar groups per molecule can be made by condensing adipic acid with an excess of 1,12-dodecane diol to produce a linear polyester of molecular weight about 5,000, the terminal hydroxyl groups being reacted with sulphur trioxide/pyridine complex to convert them to sulphonic acid groups.

A solvatable condensation polymer chain containing a plurality of polar groups may be made by condensing a mixture of maleic anhydride and succinic anhydride (molar ratio 1:4) with dodecane diol, the polymer then being treated with sodium hydrogen sulphite to introduce sulphonic groups.

Where the stabilizer contains a plurality of solvated components and polar groups distributed along a polymeric backbone the backbone may be made by condensation reaction, specific polar interaction or preferably addition polymerization.

A backbone provided with both the chain-like components and the polar groups required for the protolytic reaction with the disperse polymer particles can be made by copolymerizing a mixture of ethylenically unsaturated monomers of which one monomer contains the chain-like component and another contains the polar group.

For example, a solvatable polymeric chain-like component having a terminal unsaturated group suitable for co-polymerization with a monomer containing the polar group may be made by the method described in the above-mentioned patent. Suitable monomers containing the reactive group are exemplified above. Alternatively, a monomer containing both polar group and solvated component can be used, e.g. mono-octadecyl itaconate, optionally with a monomer devoid of such reactive group and solvated component, e.g. styrene.

In another method, the solvated components and/or the polar groups may be attached after the backbone has been formed. This attachment may be made by a wide variety of reactions such as:

the reaction of carboxyl group with hydroxyl group;
the reaction of anhydride group with hydroxyl group;
the reaction of isocyanate group with hydroxyl group;
the reaction of epoxide group with hydroxyl group;
the reaction of ester group with hydroxyl group;
the reaction of amide group with hydroxyl group;
the reaction of isocyanate group with carboxyl group;
the reaction of ester group with carboxyl group;
the reaction of carboxyl group with amine group;
the reaction of ester group with amine group;
the reaction of ethylenically unsaturated group with amine group;
the reaction of isocyanate group with amine group;
the reaction of anhydride group with amine group;

the reaction of amide group with amine group;
the reaction of epoxide group with amine group;
the reaction of acid group with amine group;
the reaction of hydroxyl group with methylol group;
the reaction of amide group with methylol group.

One method which is particularly suitable when the polar group is also one which can take part in a condensation reaction, e.g. —COOH, is to form a polymeric backbone having attached to it polar groups in excess of the proportion required for the protolytic reaction and then, by a condensation reaction, attach solvated chain-like components to a proportion of those groups. For example, a polymeric backbone carrying carboxyl groups may be made by polymerization of an unsaturated acid such as methacrylic, itaconic or maleic acid optionally with another monomer such as an acrylic or methacrylic ester or a vinyl benzene, the solvated chain-like components then being attached by reacting a proportion of the carboxyl groups with a high alkyl, e.g. a $C_{18}$, amine or alcohol the long chain of which is solvatable by the organic liquid of the dispersion. Alternatively, the polymeric backbone may contain acid anhydride groups, e.g. by copolymerization of maleic or itaconic acid anhydride, the solvated component being attached by reacting high alkyl, e.g. $C_{18}$, alcohol or amine, with the anhydride groups.

As another alternative, the solvated chain-like component may be provided by reacting with groups on the backbone a suitable solvated addition polymer having a terminal reactive group, e.g. an epoxy- or amine-terminated polylauryl methacrylate polymer produced by the method of the above-mentioned patent. Alternatively, solvatable condensation polymers such as self-polyesters of hydroxy acids may be reacted with groups on the backbone.

Another method as described above is to use in the backbone a co-monomer which can be reacted with another compound to introduce the desired acidic or basic polar groups.

On the other hand, the polar groups necessary for the protolytic reaction may be attached to a polymeric backbone carrying the solvated chain-like constituents. For example, styrene copolymerized in the backbone can be sulphonated to provide a stabilizer containing sulphonic groups.

Provided the backbone is capable of accommodating a sufficient number of solvated chain-like components and specific interacting polar groups, it may be made by condensation polymerization reaction. Thus, suitable polymeric backbones are the condensation products of polycarboxylic acids with polyols; polycarboxylic acids with polyamines; caprolactam condensates of the nylon 6 type; polyester amides; polyurethanes comprising the reaction products of polyisoicyanates with polyols; polyethers; polyesters; epoxide, resins, polyamides; polyureas; polysulphides; polysulphones; polyoxymethylenes. Yet another suitable backbone may be formed from ionic polymers such as nylon 66 salt. It is, however, understood that the stabilizers derived from such backbones must remain soluble in the non-aqueous medium.

By selecting appropriate monomers or comonomers the backbone may be made by condensation processes which provide the solvated components and polar groups of the stabilizer at the same time. For example, glycidyl stearate reacted with phthalic anhydride will produce a linear condensation polymer chain carrying polar groups (ester carbonyl) in the chain and solvatable $C_{18}$ components attached to the chain. If desired stronger polar groups may be provided on the backbone by using 4-nitro phthalic anhydride or 4-cyano phthalic anhydride in place of the phthalic anhydride. Alternatively, the solvatable components and/or polar groups may be attached to a condensation polymer backbone by methods analogous to those described above.

The stabilizer backbone itself may be formed by specific polar interaction. When a substance such as magnesium stearate, which contains one polar group and one solvatable chain-like component, is solvated by a non-polar non-aqueous liquid, it can be shown by calculation of the associated molecular weight from freezing point depression measurements, that the magnesium stearate molecules associate by specific polar interaction into chains. Sufficient polar forces remain at the polar sites along the backbone to interact with matching polar groups in the dispersed polymer. This provides a simple and effective means of forming a stabilizer bearing a plurality of polar groups and a plurality of solvatable chain-like components. Similar associations occur with mono-alkyl phosphates; of the two residual hydroxyl groups in the molecule, one associates with hydroxyls in other molecules to form a structure which carries a plurality of polar groups (the remaining hydroxyl groups) and a plurality of a solvated chain-like components (the alkyl groups).

A further alternative and one which provides dispersions of high mechanical and thermal stability is to use feed stage stabilizers which, although not containing polymerizable double bonds, provide chemically reactive groups which will co-react with complementary chemically reactive groups of the disperse polymer to provide from 1–10 preferably from 1–4 covalent links per co-reacted stabilizer molecule therewith. Suitable stabilizers of this type may be selected, for example, from those herein described.

The co-reaction by means of which chemical bonds are formed between stabilizer molecules and the disperse polymer may be an addition reaction between chemically reactive groups provided by stabilizer molecules and complementary chemically reactive groups provided by the disperse polymer. Suitable pairs of complementary groups include, for example:

Acid anhydride group with hydroxyl group
Acid anhydride group with amine group
Acid anhydride group with mercaptan group
Epoxide group with acid group
Epoxide group with amine
Isocyanate group with hydroxyl group
Isocyanate group with amine group
Hemiformal group with amide group
Carbonate group with amine group
N-carbamate cycloimide group with amine group
N-carbamyl cycloimide group with hydroxyl group.

The general conditions under which addition reactions take place between such pairs of groups are well known and it will be understood that the temperatures at which these reactions take place depend on the pairs of reactive groups selected and may also be modified by the use of catalysts. For example, the following are some typical suitable reaction conditions:

| Pairs of coreactive groups | Catalyst | Temperature |
| --- | --- | --- |
| Acid anhydride:hydroxyl | Triethylamine or N-dimethyl amine. | 80 to 125° C. |
| Acid anhydride:amine | Nil | 20 to 125 C. |
| Epoxide:acid | Triethylamine | 80 to 125° C. |
| Epoxide:amine | Nil | 20 to 100° C. |
| Isocyanate:alcohol hydroxyl | Stannous chloride or zinc chloride. | 30 to 125° C. |
| Isocyanate:amine | Nil | 20 to 100° C. |
| Carbonate:amine | Nil | Room temperature. |
| N-carbamyl cycloimide:hydroxyl | Zinc chloride | 50 to 130° C. |
| N-carbamyl cycloimide:amine | Nil | 30 to 100° C. |

The chemically reactive group is provided in the disperse polymer by use in the dispersion polymerization of an α,β-ethylenically unsaturated monomer containing such a group. The disperse polymer may be a copolymer derived from such a monomer containing the reactive group, the monomer usually being copolymerized in a minor proportion.

Suitable monomers providing reactive groups include, for example: maleic anhydride (acid) and itaconic acid, acid esters of maleic and itaconic acid, glycidyl (meth) acrylate, hydroxyalkyl (meth) acrylate, acrylamide, methacrylamide, dimethyl aminoethyl methacrylate, vinylidene carbonate and N-carbamyl maleimide.

The number of chemically reactive groups in the disperse polymer is not critical, the only requirement being that a sufficient number of such groups must be available in the polymer to co-react with the selected number of co-reacting groups provided by the stabilizer. An excess of chemically reactive groups over the stoichiometric proportion required for the co-reaction may be present in the disperse polymer. The actual number of chemically reactive groups taking part in the co-reaction is determined by, for example the reaction conditions and the weight ratio of stabilizer to disperse polymer.

The stabilizer may be derived from a block or graft copolymer; and comprise at least one component which is solvated by the non-aqueous liquid and at least one other component, herein termed the anchoring component, of different polarity which is relatively non-solvated by the liquid, the solvated component having a molecular weight of from 500 to 5,000, the anchoring component having a molecular weight of at least 250 and the total weight ratio of solvated component to anchoring component being from 0.5–1.5 to 5.0:1.0. Reactive groups may be introduced into the anchoring component of the stabilizer by, for example, the selection of a suitable monomeric constituent in the preparation of the stabilizer.

The desired chemically reactive groups may already be present in the stabilizer, which is selected with regard to the nature of the non-aqueous liquid and of the disperse polymer. For example the association between the stabilizer and the disperse polymer may be the result of the interaction between anhydride groups in the stabilizer and epoxide groups in the disperse polymer. At temperature higher than those customarily used in the dispersion polymerization process and/or in the presence of a catalyst, e.g. a teritary amine, at least some of the anhydride groups and epoxide groups can be co-reacted to provide covalent links between the stabilizer and disperse polymer.

When a selected stabilizer does not comprise suitable reactive groups the required groups are introduced into the molecule by incorporating therein a proportion of a component supplying the desired groups or alternatively by a chemical modification of groups already present in the molecule. Bearing in mind that the modified stabilizer must remain soluble in the organic liquid this will in general mean that the modification is carried out without altering the solvated components of the stabilizer. That is the modification is made to the stabilizer molecule by the introduction into the molecule of a proportion of a component supplying the desired groups or by the modification of groups already present in the anchoring component of the molecule.

The polymerization is carried out by adding monomer, seed stage stabilizer and polymerization initiator to the inert organic liquid at the chosen reaction temperature and within the above-specified proportional limits, then maintaining the reaction temperature until a permanent cloud of disperse polymer "seed" is formed. The preferred ratios of monomer and copolymerizable stabilizer in the seed stage to provide the most favorable processing conditions are from 1:5 to 9:1 by weight. It is known in the art that the concentration of free radicals (which in turn depends on the nature of the polymerization initiator and the reaction temperature) and the ratio of stabilizer to monomer can be varied, and hence are so selected, to control the particle diameter of the disperse polymer particles which form. It would appear, although our invention is not limited by this explanation, that when the process is carried out under the conditions we described, there is a very high efficiency of utilization of stabilizer leading to unexpectedly fine and uniform diameter seed. We ascribe to this unexpectedly efficient stabilization the ability to include an unusually large proportion of monomer in the seed stage and the robust nature of our process. Copolymerizable polymeric stabilizer may be, but is not necessarily, the only stabilizer present in the seed stage although for the purpose of calculating the above ratios of monomer to stabilizer in the seed stage, no account is taken of any non-copolymerizing stabilizer. Optionally, all of the stabilizer of the dispersion may be added during the seed stage of the process.

At the completion of the seed formation, the balance of polymerizable monomer, initiator and stabilizer is added to the dispersion and the polymerization completed. Optionally co-reaction of stabilizer and disperse polymer by an addition reaction other than a copolymerization reaction may be carried out concurrently or subsequent to the polymerization reaction.

The feed stage reactants may be pre-mixed and added as a single feed mixture to the seed stage dispersion. For maximum processing stability, however, we prefer to add a proportion, say 20–80% by weight of the total feed stage stabilizer to the completed seed stage prior to the commencement of a gradual addition thereto of polymerizable monomer and initiator and to add the balance of stabilizer in a gradually diminishing proportion with the monomer feed. The diminishing addition of stabilizer is controlled approximately to correspond with the rate of increase of surface area of disperse polymer particles, but is not critical.

The rate of addition of feed stage monomer is not critical and in practice we establish a maximum rate of addition for a particular dispersion by experiment. If the rate of addition is too rapid, the dispersion will coagulate or become unstable on storage.

In general, conventional catalysts, initiators, chain transfer agents, etc. can be used in the polymerization process which is preferably carried out at a temperature not exceeding 100° C.

In this way, dispersions of a disperse polymer content of from a few percent up to 60% by weight or even higher can be readily prepared.

Dispersions of the type we have described have application as, for example, surface coatings, when they may include other components such as pigments, thickeners, pigment dispersants and light-degradation stabilizers.

The invention is illustrated by the following examples in which all proportions are by weight and in which certain component materials are identified as follows.

HYDROCARBON LIQUIDS (1) Aromatics free hydrocarbons:
    hydrocarbon A—boiling range 180–210° C.
    hydrocarbon B—boiling range 40–60° C.
    hydrocarbon C—boiling range 114–144° C.
    hydrocarbon D—boiling range 55–72° C.
    hydrocarbon H—boiling range 32—67° C.
(2) Low aromatics hydrocarbon:
    hydrocarbon G—boiling range 33–82° C., aromatics content approximately 1.5% by weight.

STABILIZER SOLUTION A

A self-polyester of 12-hydroxy stearic acid of molecular weight approximately 1700 condensed with glycidyl methacrylate to introduce therein a polymerizable double bond (hereinafter referred to as monomer A) was copolymerized with methyl methacrylate and glycidyl methacrylate in the ratios by weight of 66/30/4 in the presence of hydrocarbon A, hydrocarbon D and ethylene glycol diacetate in the weight/ratios of 0.749/0.519/1.732 to produce a 50% solids by weight solution of a polymeric stabilizer intermediate of molecular weight about 70,000.

This intermediate was then modified to introduce polymerizable double bonds therein in the following manner.

| The following mixture: | Parts |
|---|---|
| Stabilizer intermediate solution (above) | 5279.0 |
| Methacrylic acid | 39.6 |
| Hydroquinone | 0.6 |
| Coconut fatty acids tertiary amine | 3.0 | was heated to reflux (approximately 110° C.) in a reaction vessel fitted with a reflux condenser and held at reflux for 5 hours. The solution of copolymerizable stabilizer so formed was identified as stabilizer solution A.

STABILIZER SOLUTION B

Monomer A, methyl methacrylate and glycidyl methacrylate were copolymerized in the ratios by weight of 45/50/5 in the presence of hydrocarbon C, ethylene glycol diacetate and N,N-dimethyl formamide in the weight of 0.556/2.223/0.221 at 130° C. A 50% solids by weight solution of a polymeric stabilizer intermediate was formed.

This intermediate was then modified to introduce therein polymerizable double bonds in the following manner.

| The following mixture: | Parts |
|---|---|
| Stabilizer intermediate solution (above) | 6504.0 |
| Methylacrylic acid | 62.0 |
| Hydroquinone | 5.0 |
| Coconut fatty acids tertiary amine | 5.0 |
| Hydrocarbon B | 200.0 | was heated to reflux (approximately 110° C.) in a reaction vessel fitted with a reflux condenser and held at reflux for 5 hours. The solution of copolymerizable stabilizer so formed was identified as stabilizer solution B.

STABILIZER SOLUTION C

| A mixture of: | Parts |
|---|---|
| Stabilizer intermediate solution (from stabilizer solution B) | 2400.0 |
| p-Nitrobenzoic acid | 50.0 |
| Coconut fatty acids tertiary amine | 2.5 | was heated to reflux (approximately 130° C.) in a reaction vessel fitted with a reflux condenser and held at reflux for 3 hours. The solution of polymeric stabilizer so formed was identified as stabilizer solution C.

STABILIZER SOLUTION D

A solution of polymeric stabilizer identified as stabilizer solution D was prepared by the general method of stabilizer solution D but reducing the methacrylic acid content from 62.0 to 40.0 parts.

STABILIZER SOLUTION E

Monomer A, methyl methacrylate and glycidyl methacrylate were copolymerized in the ratios by weight of 52/40/8 in the presence of hydrocarbon C, ethylene glycol diacetate and N,N-dimethyl formamide in the weight ratios of 0.556/2.223/0.221 at 130° C. A 50% solids by weight solution of a polymeric stabilizer intermediate was formed.

This intermediate was then modified to introduce therein polymerizable double bonds in the following manner.

| The following mixture: | Parts |
|---|---|
| Stabilizer intermediate solution (above) | 6504.0 |
| Methacrylic acid | 40.0 |
| Hydroquinone | 1.2 |
| Coconut fatty acids tertiary amine | 5.0 |
| Hydrocarbon C | 200.0 | was heated to reflux (approximately 110° C.) in a reaction vessel fitted with a reflux condenser and held at reflux for 5 hours. The solution of copolymerizable stabilizer so formed was identified as stabilizer solution E.

STABILIZER SOLUTION F

| A mixture of: | Parts |
|---|---|
| Stabilizer intermediate solution (from stabilizer solution E) | 2400.0 |
| p-Nitrobenzoic acid | 50.0 |
| Coconut fatty acids tertiary amine | 2.5 | was heated to reflux (approximately 130° C.) in a reaction vessel fitted with a reflux condenser and held at reflux for 3 hours. The solution of polymeric stabilizer containing free epoxide groups so formed was identified as stabilizer solution F.

EXAMPLE 1

Preparation of a dispersion of 40% by weight poly-(methyl methacrylate) in an inert organic liquid. The seed stages comprises 11% by weight of the total polymerizable monomer and a proportion by weight of 9:1 of polymerizable monomer to copolymerizable stabilizer. The feed stage stabilizer was added to the batch at a diminishing concentration as the addition of feed monomer progressed.

| The following mixture: | Parts |
|---|---|
| Hydrocarbon A | 102.0 |
| Hydrocarbon C | 74.9 |
| Hydrocarbon D | 110.0 | was heated to reflux, a mixture of 15 parts of n-butyl benzyl phthalate, 18.1 parts of methyl methacrylate, 3.1 parts of azodiisobutyronitrile and 4.1 parts of stabilizer solution A added and refluxing continued for 20 minutes at 79–80° C. A cloud of stable, disperse seed polymer formed:

| A mixture of: | Parts |
|---|---|
| Methyl methacrylate | 144.0 |
| Azodiisobutyronitrile | 1.2 |
| Primary octyl mercaptan (10% solids solution in aliphatic hydrocarbon) | 0.8 | was prepared and divided into four equal portions by weight. To each one of these portions was added a quantity of stabilizer solution A in the amounts of 7.90, 5.75, 2.20 and 0.65 parts respectively.

The four feed solutions so formed were added consecutively at a uniform rate over a period of 45 minutes and in the above order to the refluxing contents of the batch (temperature approximately 80° C.) and reflux maintained for a further 30 minutes.

A stable dispersion of polymer was formed.

EXAMPLE 2

By way of comparison with Example 1 the preparation of a similar 40% solids by weight dispersion of poly-(methyl methacrylate) was attempted but the seed stage monomer concentration was decreased to 6.5% by weight of the total polymerizable monomer. The feed stage stabilizer was added to the batch at a uniform rate during the feed stage monomer addition.

| A mixture of: | Parts |
|---|---|
| Hydrocarbon A | 2022.00 |
| Hydrocarbon B | 580.00 |
| n-Butyl benzyl phthalate | 106.50 |
| Stabilizer solution A | 49.50 |
| Methyl methacrylate | 148.30 |
| Azodiisobutyronitrile | 15.20 |
| Primary octyl mercaptan (10% solution in aliphatic hydrocarbon) | 4.56 | was placed in a reaction vessel fitted with a reflux condenser and mechanical stirrer, heated to 70° C., the temperature then raised to 80° C. in 10 minutes and held at that temperature for a further 20 minutes. A fine, stable cloud of disperse seed polymer was formed.

The following mixture:

| | Parts |
|---|---|
| Methyl methacrylate | 2070.0 |
| Stabilizer solution A | 285.0 |
| Azodiisobutyronitrile | 15.0 |
| Primary octyl mercaptan | 6.0 | was added to the refluxing contents of the reaction vessel at a uniform rate over a period of 3 hours in such a way that the mixture was well diluted by the reflux return. At the end of the feed addition, the dispersion became unstable.

EXAMPLE 3

Preparation of a dispersion of 40% by weight poly(methyl methacrylate) in an inert organic liquid. The seed stage comprises 67% by weight of the total polymerizable monomer and a proportion by weight of 2.4:1 of polymerizable monomer to copolymerizable stabilizer. The feed stage stabilizer is a non-copolymerizing polymeric stabilizer.

The mixture of:

| | Parts |
|---|---|
| Methyl methacrylate | 9,000 |
| Stabilizer solution B | 7,500 |
| Azodiisobutyronitrile | 150 |
| Primary octyl mercaptan | 4.0 |
| Hydrocarbon A | 18,300.0 |
| Hydrocarbon C | 5,000.0 |
| Hydrocarbon D | 15,000.0 | was added to a reaction vessel fitted with a reflux condenser, heated to reflux (80° C.) and held at reflux for 20 minutes. A fine, stable cloud of disperse seed polymer formed.

The following feed solutions were prepared.

No. 1:

| | Parts |
|---|---|
| Methyl methacrylate | 2250 |
| Azodiisobutyronitrile | 9 |
| Stabilizer solution C | 500 |
| Primary octyl mercaptan | 5 |

No. 2:

| | Parts |
|---|---|
| Methyl methacrylate | 2250 |
| Azodiisobutyronitrile | 9 |
| Stabilizer solution C | 400 |
| Primary octyl mercaptan | 4 |

The above two feed solutions were added consecutively at a uniform rate over a period of 25 minutes each to the refluxing batch and reflux maintained for a further 15 minutes. Low-boiling liquid was then removed under vacuum until the solids content of the dispersion by weight reached 40%.

A stable dispersion of polymer was formed.

EXAMPLE 4

A similar dispersion to that of Example 3 is prepared but with a reduction in the weight of seed stage polymerizable monomer to 33% of the total monomer, a proportion by weight of 1.4:1 of polymerizable monomer to copolymerizable stabilizer and at a constant total polymeric stabilizer concentration in the dispersion, the use of twice the amount of non-copolymerizing stabilizer, added during the feed stage.

A mixture of:

| | Parts |
|---|---|
| Methyl methacrylate | 4,500.00 |
| Stabilizer solution B | 6,500.00 |
| Azodiisobutyronitrile | 150.00 |
| Primary octyl mercaptan | 1.25 |
| Hydrocarbon A | 17,000.00 |
| Hydrocarbon C | 4,000.00 |
| Hydrocarbon D | 15,000.00 | was added to a reaction vessel fitted with a reflux condenser, heated to reflux (80° C.) and held at reflux for 20 minutes. A fine, stable cloud of disperse seed polymer formed.

The following feed solutions were prepared:

No. 1:

| | Parts |
|---|---|
| Methyl methacrylate | 4500 |
| Azodiisobutyronitrile | 9 |
| Stabilizer solution C | 1000 |
| Primary octyl mercaptan | 10 |

No. 2:

| | Parts |
|---|---|
| Methyl methacrylate | 4500 |
| Azodiisobutyronitrile | 9 |
| Stabilizer solution C | 900 |
| Primary octyl mercaptan | 10 |

The above two feed solutions were added consecutively at a uniform rate over a period of 40 minutes each to the refluxing batch and reflux maintained for a further 15 minutes. Low-boiling liquid was then removed under vacuum until the solids content of the dispersion by weight reached 40%.

A stable dispersion of polymer was formed. In particular, when compared with Example 3, this example demonstrates that within the defined process limits of our invention, a stable dispersion of poly(methyl methacrylate) can be prepared satisfactory under widely differing processing conditions.

EXAMPLE 5

Preparation of a dispersion of 55% by weight poly(methyl methacrylate) in an inert organic liquid. The seed stage comprises 18% by weight of the total polymerizable monomer and a proportion of 2.5:1 of polymerizable monomer to copolymerizable polymeric stabilizer. Additionally the balance of the stablizer, which is a non-copolymerizing polymeric stabilizer, is included in the seed stage.

A mixture of:

| | Parts |
|---|---|
| Stabilizer solution C | 1000.00 |
| Methyl methacrylate | 1000.00 |
| Stabilizer solution D | 800.00 |
| Azodiisobutyronitrile | 50.00 |
| Primary octyl mercaptan | 0.75 |
| Hydrocarbon A | 3000.00 |
| Hydrocarbon C | 1230.00 |
| Hydrocarbon G | 2500.00 |
| n-Butyl benzyl phthalate | 500.00 | was added to a reaction vessel fitted with a reflux condenser and stirrer, heated to reflux (80° C.) and held at reflux for 40 minutes. A fine, stable dispersion of polymer seed was formed.

A mixture of:

| | Parts |
|---|---|
| Methyl methacrylate | 4560.0 |
| Azodiisobutyronitrile | 7.7 |
| Primary octyl mercaptan | 12.5 | was added to the refluxing batch over a period of 2 hours 30 minutes and then low-boiling liquid removed under vacuum to give a total solids content by weight of 55%.

A stable dispersion was formed.

EXAMPLE 6

Preparation of a dispersion of 42% by weight of a carboxyl-modified poly(methyl methacrylate) in an inert organic liquid. The seed stage comprises 18% by weight of the total polymerizable monomer and a proportion of 3.3:1 of polymerizable monomer to a copolymerizable polymeric stabilizer. The balance of the stabilizer, which is a non-copolymerizing polymeric stabilizer, is included in the seed stage. Additionally, the disperse polymer is co-reacted with the non-copolymerizing stabilizer to form covalent bonds therewith by co-reaction of carboxyl groups of the disperse polymer with epoxide groups of the stabilizer.

A mixture of: Parts
Stabilizer solution F ........................ 800.00
Methyl methacrylate ......................... 1000.00
Stabilizer solution E ........................ 600.00
Azodiisobutyronitrile ........................ 50.00
Primary octyl mercaptan ..................... 0.75
Hydrocarbon A ............................... 3000.00
Hydrocarbon C ............................... 2150.00
Hydrocarbon D ............................... 3000.00
n-butyl benzyl phthalate .................... 400.00 was added to a reaction vessel fitted with a reflux condenser and mechanical stirrer, heated to reflux and held at reflux for 40 minutes. A fine cloud of stable disperse seed polymer was formed.

A mixture of: Parts
Methyl methacrylate ......................... 4560.0
Azodiisobutyronitrile ....................... 7.7
Primary octyl mercaptan ..................... 12.5 was added to the refluxing contents of the reaction vessel at a uniform rate over a period of 2 hours, followed by the addition in a further 8 minutes of a mixture of 55 parts of methyl methacrylate and 55 parts of methacrylic acid. Refluxing was continued for a further 20 minutes to give a stable polymer dispersion.

To the above dispersion was added a mixture of 2500 parts of hydrocarbon C and 15 parts of coconut fatty acids tertiary amine, the total solids of the batch then being increased to 42% by concentration under vacuum. The batch was then heated at reflux (approximately 115° C.) for a further 2 hours to co-react carboxyl groups of the dispersed polymer with epoxide groups of the stabilizer.

A stable dispersion of polymer was formed.

EXAMPLE 7

Preparation of a dispersion of 40% by weight poly (methyl methacrylate/ethyl acrylate) in an inert organic liquid. The seed stage comprises 11% by weight of the total polymerizable monomer and a proportion by weight of 0.67:1 of polymerizable monomer to copolymerizable stabilizer. The feed stage stabilizer was added to the batch at a diminishing concentration as the addition of feed monomer progressed.

The following mixture: Parts
Hydrocarbon A ............................... 366.0
Hydrocarbon C ............................... 120.0
Hydrocarbon H ............................... 390.0 was heated to reflux (80° C.) in a reaction vessel fitted with a reflux condenser then a mixture of:

Parts
Methyl methacrylate ......................... 30.0
Azodiisobutyronitrile ....................... 3.0
n-Octyl mercaptan ........................... 0.044
Stabilizer solution B ....................... 90.0 was added and refluxing contained for 20 minutes. A cloud of stable disperse polymer formed.

The following mixture: Parts
Ethyl acrylate .............................. 120.0
Methyl methacrylate ......................... 120.0
Azodiisobutyronitrile ....................... 0.4
n-Octyl mercaptan ........................... 0.6 was divided into four equal portions by weight and the following feed mixtures prepared.

Feed 1: Parts
  Mixtures as above ......................... 60.2
  Stabilizer solution A ..................... 35.0
Feed 2:
  Mixture as above .......................... 60.2
  Stabilizer solution C ..................... 25.0
Feed 3:
  Mixture as above .......................... 60.2
  Stabilizer solution C ..................... 15.0

Feed 4: Parts
  Mixture as above .......................... 60.2
  Stabilizer solution C ..................... 4.0

The feeds were added consecutively over periods of 15 minutes each to the refluxing contents of the reaction vessel and refluxing continued for a further 20 minutes.

Low-boiling liquid was then removed under vacuum until the solids contents of the dispersion reached 40% by weight. A stable dispersion of polymer was formed.

EXAMPLE 8

Preparation of a dispersion of 40% by weight poly (methyl methacrylate/ethyl acrylate) in an inert organic liquid. The seed stage comprises 11% by weight of the total polymerizable monomer and a proportion by weight of 9:1 of polymerizable monomer to copolymerizable stabilizer. The feed stage stabilizer was added to the batch at a diminishing concentration as the addition of feed monomer progressed.

The following mixture: Parts
Hydrocarbon A ............................... 334.5
Hydrocarbon C ............................... 124.3
Hydrocarbon D ............................... 192.8 was heated to reflux (80° C.) in a reaction vessel fitted with a reflux condenser and then a mixture of:

Parts
Methyl methacrylate ......................... 22.5
Ethyl acrylate .............................. 7.5
Stabilizer solution B ....................... 6.8
Azodiisobutyronitrile ....................... 5.1
n-Butyl benzyl phthalate .................... 24.8 was added into the reaction vessel and the refluxing continued for 20 minutes. A cloud of disperse polymer formed.

The following feed mixtures were prepared:

Feed 1: Parts
  Methyl methacrylate ....................... 44.8
  Ethyl acrylate ............................ 15.0
  Azodiisobutyronitrile ..................... 0.46
  n-Octyl mercaptan ......................... 0.03
  Stabilizer solution B ..................... 11.95
Feed 2:
  Methyl methacrylate ....................... 44.8
  Ethyl acrylate ............................ 15.0
  Azodiisobutyronitrile ..................... 0.46
  n-Octyl mercaptan ......................... 0.03
  Stabilizer solution B ..................... 8.97
Feed 3:
  Methyl methacrylate ....................... 44.8
  Ethyl acrylate ............................ 15.0
  Azodiisobutyronitrile ..................... 0.46
  n-Octyl mercaptan ......................... 0.03
  Stabilizer solution C ..................... 5.98
Feed 4:
  Methyl methacrylate ....................... 44.8
  Ethyl acrylate ............................ 15.0
  Azodiisobutyronitrile ..................... 0.46
  n-Octyl mercaptan ......................... 0.03
  Stabilizer solution C ..................... 2.99

The feeds were added consecutively to the refluxing contents of the reaction vessel over periods of 15 minutes each and refluxing continued for a further 20 minutes. Low-boiling liquid was then removed under vacuum until the solids contents of the dispersion reached 40% by weight of stable dispersion of polymer formed.

EXAMPLE 9

Preparation of a dispersion of 55% by weight poly(methyl methacrylate/n-butyl methacrylate) in an inert organic liquid. The seed stage comprises 18% by weight of the total polymerizable monomer and a proportion of 1.1:1 of polymerizable monomer to copolymerizable polymeric stabilizer. The feed stage stabilizer is added to the batch at a diminishing concentration as the addition of feed monomer progresses, there being no stabilizer at all in the final monomer feed mixture.

A mixture of:

| | Parts |
|---|---|
| Stabilizer solution B | 1800.00 |
| Methyl methacrylate | 1000.00 |
| Azodiisobutyronitrile | 50.00 |
| Primary octyl mercaptan | 0.75 |
| Hydrocarbon A | 3000.00 |
| Hydrocarbon C | 1230.00 |
| Hydrocarbon G | 2500.00 |
| n-Butyl benzyl phthalate | 500.00 | was added to a reaction vessel fitted with a reflux condenser and stirrer, heated to reflux (80° C.) and held at reflux for 20 minutes. A fine, stable dispersion of polymer seed was formed.

The following mixture:

| | Parts |
|---|---|
| Methyl methacrylate | 4100.0 |
| n-Butyl methacrylate | 460.0 |
| Azodiisobutyronitrile | 7.7 |
| n-Octyl mercaptan | 12.5 | was divided into three equal portions of 1529 parts each by weight and the following feed mixtures prepared.

| Feed 1: | Parts |
|---|---|
| Mixture as above | 1529.0 |
| Stabilizer solution C | 200.0 |
| Feed 2: | |
| Mixture as above | 1529.0 |
| Stabilizer solution C | 75.0 |
| Feed 3: | |
| Mixture as above | 1529.0 |

The feeds were added consecutively to the refluxing contents of the reaction vessel over a period of 20 minutes each and refluxing continued of a further 20 minutes. A stable dispersion of polymer formed.

EXAMPLE 10

Preparation of a dispersion of 55% by weight poly(methyl methacrylate/2-ethyl hexyl acrylate) in an inert organic liquid. The seed stage comprises 18% by weight of the total polymerizable monomer and a proportion of 1.1:1 of polymerizable monomer to copolymerizable polymeric stabilizer. The feed stage stabilizer is added to the batch at a diminishing concentration as the addition of feed monomer progresses.

A mixture of:

| | Parts |
|---|---|
| Stabilizer solution B | 1800.00 |
| Methyl methacrylate | 1000.00 |
| Azodiisobutyronitrile | 50.00 |
| Primary octyl mercaptan | 0.75 |
| Hydrocarbon A | 3000.00 |
| Hydrocarbon C | 1230.00 |
| Hydrocarbon G | 2500.00 |
| n-Butyl benzyl phthalate | 500.00 | was added to a reaction vessel fitted with a reflux condenser and stirrer, heated to reflux (80° C.) and held at reflux for 20 minutes. A fine, stable dispersion of polymer seed was formed.

The following mixture:

| | Parts |
|---|---|
| Methyl methacrylate | 4160.0 |
| 2-ethyl hexyl acrylate | 400.0 |
| Azodiisobutyronitrile | 7.7 |
| n-Octyl mercaptan | 12.5 | was divided into three equal portions of 1529 parts each by weight and the following feed mixtures prepared.

| Feed 1: | Parts |
|---|---|
| Mixture as above | 1529.0 |
| Stabilizer solution C | 200.0 |
| Feed 2: | |
| Mixture as above | 1529.0 |
| Stabilizer solution C | 100.0 |
| Feed 3: | |
| Mixture as above | 1529.0 |
| Stabilizer solution C | 50.0 |

The feeds were added consecutively to the refluxing contents of the reaction vessel over a period of 20 minutes each and continued for a further 20 minutes. A stable polymer dispersion formed.

EXAMPLE 11

Preparation of a dispersion of 40% by weight poly (methyl methacrylate) in an inert organic liquid. The seed stage comprises 11% by weight of the total polymerizable monomer and a proportion by weight of 9:1 of polymerizable monomer to copolymerizable stabilizer. The feed stage stabilizer was added to the batch at a diminishing concentration as the addition of feed monomer progressed.

The following mixture:

| | Parts |
|---|---|
| Hydrocarbon A | 334.5 |
| Hydrocarbon C | 124.3 |
| Hydrocarbon D | 192.8 | was heated to reflux (80° C.) in a reaction vessel fitted with a reflux condenser and then a mixture of:

| | Parts |
|---|---|
| Methyl methacrylate | 30.0 |
| Stabilizer solution B | 6.8 |
| Azodiisobutyronitrile | 5.1 |
| n-Butyl benzyl phthalate | 24.8 | was added and refluxing continued for 20 minutes. A cloud of disperse polymer formed.

| Feed 1: | Parts |
|---|---|
| Methyl methacrylate | 59.8 |
| Azodiisobutyronitrile | 0.46 |
| n-Octyl mercaptan | 0.03 |
| Stabilizer solution B | 11.95 |
| Feed 2: | |
| Methyl methacrylate | 59.8 |
| Azodiisobutyronitrile | 0.46 |
| n-Octyl mercaptan | 0.03 |
| Stabilizer solution B | 8.97 |
| Feed 3: | |
| Methyl methacrylate | 59.8 |
| Azodiisobutyronitrile | 0.46 |
| n-Octyl mercaptan | 0.03 |
| Stabilizer solution C | 5.98 |
| Feed 4: | |
| Methyl methacrylate | 59.8 |
| Azodiisobutyronitrile | 0.46 |
| n-Octyl mercaptan | 0.03 |
| Stabilizer solution C | 2.99 |

The feeds were added consecutively to the refluxing contents of the reaction vessel over a period of 15 minutes each and refluxing continued for a further 20 minutes. Low-boiling liquid was then removed under vacuum until the solids content of the dispersion reached 40% by weight. A stable dispersion of polymer formed.

What is claimed is:

1. In a process of preparing a dispersion of polymer in an inert organic liquid in which the polymer is insoluble which comprises polymerizing $\alpha,\beta$-ethylenically unsaturated monomer in the liquid to form the polymer and in the presence of polymeric dispersion stabilizer which associates with the disperse polymer and comprises at least one component which is solvated by the organic liquid and provides around the polymer particles a stabilizing steric barrier; the improvement wherein the polymerization is carried out in a two-stage reaction consisting of a seed stage and a feed stage and is characterized in that:

(1) the seed stage comprises adding to the inert organic liquid the said unsaturated monomer and copolymerizable seed stage polymeric stabilizer in a proportion by weight of 1:10 to 15:1, the amount of monomer in said seed stage being from 7 to 70% by weight of the total monomer polymerized in the process, said seed stage stabilizer being initially soluble in the non-aqueous liquid of the dispersion, associating with the disperse particles and comprising components which are solvated by the liquid to provide around the disperse polymer particles a stabilizing steric barrier, the said seed stage stabilizer being further characterized in that each molecule thereof provides at least one polymerizable double bond per stabilizer molecule which polymerizes with said unsaturated monomer;

(2) the feed stage comprises polymerizing the remaining unsaturated monomer in the presence of feed stage polymeric stabilizer which associates with the disperse polymer and comprises at least one component which is solvated by the organic liquid and provides around the polymer particles a stabilizing steric barrier, and which stabilizer is not copolymerizable with said monomer, the amount of monomer polymerized in said feed stage being 30-93% by weight of the total monomer polymerized in the process;

(3) the total weight of polymeric stabilizer in the dispersion is from 0.5-50% by weight of the weight of disperse polymer.

2. A process according to claim 1 in which the concentration of polymeric stabilizer added to the dispersion with unsaturated monomer during the feed stage is progressively decreased as the proportion of added monomer increases.

3. A process according to claim 1 in which the feed stage stabilizer provides chemically reactive groups which co-react with complementary chemically reactive groups of the disperse polymer to provide from 1-10 covalent links per co-reacted stabilizer molecule therewith.

4. A process according to claim 1 in which the ratio of monomer and copolymerizable stabilizer in the seed stage is from 1:5 to 9:1 by weight.

5. A process according to claim 1 in which the polymerization process is carried out at a temperature not exceeding 100° C.

References Cited
UNITED STATES PATENTS

| | | | |
|---|---|---|---|
| 3,317,635 | 5/1967 | Osmond | 260—33.6 R |
| 3,686,114 | 8/1972 | Thompson et al. | |
| 3,399,164 | 8/1968 | Osmond | 260—34.2 |
| 3,514,500 | 5/1970 | Osmond et al. | 260—34.2 |

FOREIGN PATENTS

| | | | |
|---|---|---|---|
| 1,143,404 | 2/1969 | Great Britain | 260—34.2 |

ALLAN LIEBERMAN, Primary Examiner

U.S. Cl. X.R.

260—29.1 R, 31.8 G, 33.6 R, 33.6 UA